US007953527B2

(12) United States Patent
Thiel et al.

(10) Patent No.: US 7,953,527 B2
(45) Date of Patent: May 31, 2011

(54) METHOD FOR THE DIAGNOSIS OF, AND CONTROL DEVICE FOR CONTROLLING A MOTOR VEHICLE

(75) Inventors: Christof Thiel, Heilbronn (DE); Andreas Bethmann, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 1057 days.

(21) Appl. No.: 11/801,280

(22) Filed: May 8, 2007

(65) Prior Publication Data

US 2007/0265742 A1 Nov. 15, 2007

(30) Foreign Application Priority Data

May 8, 2006 (DE) ........................ 10 2006 021 306

(51) Int. Cl.
*G06F 17/00* (2006.01)

(52) U.S. Cl. .................................... 701/29; 123/568.11

(58) Field of Classification Search .................... 701/29, 701/100–103, 107, 108, 114, 34; 123/568.11, 123/568.12, 568.21; 73/117.01, 118.01; 60/602, 605.2, 324
See application file for complete search history.

(56) References Cited

U.S. PATENT DOCUMENTS

| | | | | |
|---|---|---|---|---|
| 4,525,782 | A | 6/1985 | Wohlfarth et al. | |
| 5,237,983 | A * | 8/1993 | Willey et al. | 123/688 |
| 5,662,123 | A | 9/1997 | Goldman | |
| 5,741,964 | A * | 4/1998 | Mizutani | 73/114.32 |
| 6,014,598 | A | 1/2000 | Duyar et al. | |
| 6,112,150 | A * | 8/2000 | Irons et al. | 701/114 |
| 6,727,812 | B2 | 4/2004 | Sauler et al. | |
| 6,766,232 | B1 | 7/2004 | Klausner | |
| 7,776,265 | B2 * | 8/2010 | Berryhill et al. | 422/68.1 |

FOREIGN PATENT DOCUMENTS

| | | |
|---|---|---|
| DE | 100 21 913 | 11/2001 |
| DE | 100 33 586 | 1/2002 |
| DE | 100 36 772 | 2/2002 |
| FR | 2808589 | 11/2001 |

* cited by examiner

*Primary Examiner* — Dalena Tran
(74) *Attorney, Agent, or Firm* — Kenyon & Kenyon LLP

(57) ABSTRACT

A method for diagnosing a motor vehicle and a control device for controlling a motor vehicle, a plurality of characteristic values, which are used for controlling the motor vehicle, being adapted. The adapted characteristic values are compared in each case to a threshold value, and an error message is generated if the adapted characteristic value goes beyond the threshold value. Normalized characteristic values are formed by a normalization, and a possibly faulty component of the motor vehicle is identified by a joint observation of a plurality of normalized characteristic values.

8 Claims, 1 Drawing Sheet

METHOD FOR THE DIAGNOSIS OF, AND CONTROL DEVICE FOR CONTROLLING A MOTOR VEHICLE

BACKGROUND INFORMATION

A method and a device for the diagnosis of a motor vehicle are described in German Patent Application No. DE 100 33 586, in which a characteristic value that is used for controlling the motor vehicle is adapted. In this context, the adapted characteristic value is compared to an upper and a lower threshold value, and an error message takes place if the adapted characteristic value goes beyond (exceeds) the upper or lower threshold value.

SUMMARY OF THE INVENTION

The method according to the present invention and the device according to the present invention have the advantage that the adapted characteristic values become comparable because of the normalization, and thus a plurality of normalized characteristic values may be utilized in common for the detection of a possibly faulty component part of the motor vehicle. This enables an improved quality in the diagnosis of a motor vehicle. Faults in a component of the motor vehicle can thus already be detected before they become noticeable as faults which influence the vehicle operation or the exhaust gas of the motor vehicle. Furthermore, it is true that a fault in the system can be detected by some diagnostic functions, but not which component is faulty. Such a faulty component can then be identified by the method according to the present invention and the control device according to the present invention.

The calculation of the normalization takes place, especially, simply starting from the adapted characteristic value, while taking into account an initial value and a threshold value for the characteristic value. In the case of fixed threshold values, they can simply be read out from a memory. Furthermore, there are threshold values which are a function of operating states. In the case of these characteristic values, the normalization then takes place as a function of the operating states of the internal combustion engine, which, particularly with regard to changing operating states, permits establishing over what time period the normalized characteristic values have a deviation from the initial value. Because of the normalization, the normalized characteristic values become independent of the operating states of the internal combustion engine. Moreover, the method according to the present invention can be utilized for triggering an additional test program, in order to recognize the cause of a possible fault before the possibly faulty component leads to interference in the operation of the motor vehicle. Thus, even before the occurrence of noticeable faults, a diagnosis can be made, so that the motor vehicle can be brought to a shop in time, before a malfunction of the motor vehicle takes place. The method according to the present invention can also be triggered in a shop, in order, here too, to track down faulty components even before the noticeable occurrence of faults. Furthermore, the method according to the present invention can also be used for determining a faulty component in response to the occurrence of a fault message, which cannot be clearly assigned to an individual component. This measure can then also be utilized to implement a meaningful emergency operation.

DETAILED DESCRIPTION

Figure 1:
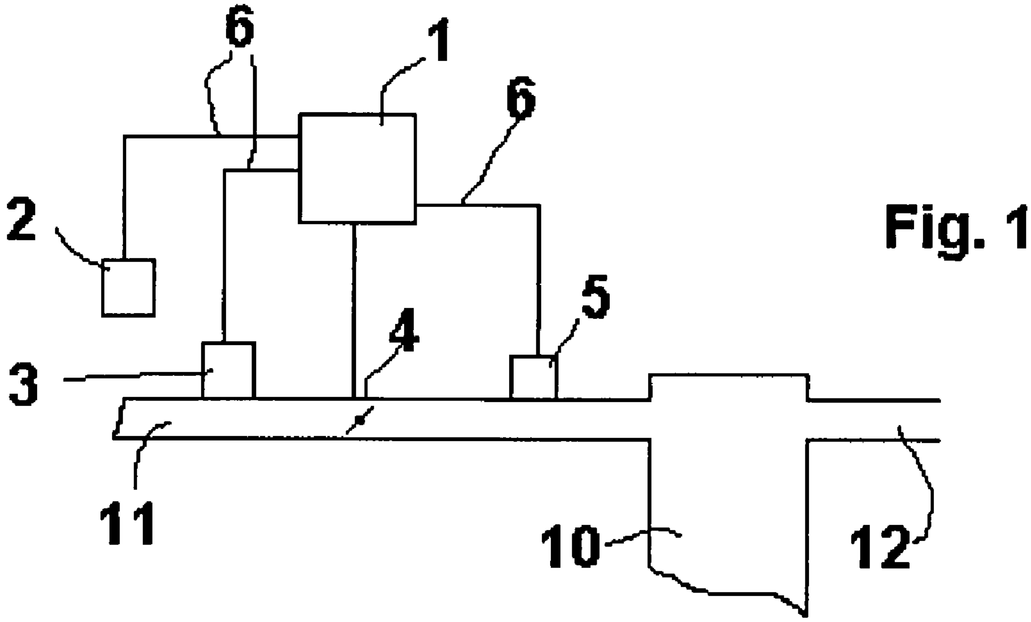
FIG. 1 shows a schematic view of a control device and an internal combustion engine of a motor vehicle.

In FIG. 1, an internal combustion engine is shown schematically, having a combustion chamber 10. Air is supplied to combustion chamber 10 through an air duct 11, which is then combusted in combustion chamber 10. The exhaust gas of this combustion is carried off through exhaust gas pipe 12. Intake and exhaust valves for the air stream, or rather, the exhaust gas stream and fuel injectors have not been shown, for the sake of simplification. The internal combustion engine is shown here as a part of the motor vehicle. The method according to the present invention and the control device according to the present invention can also be implemented at other parts of a motor vehicle. In order to control the air flow into combustion chamber 10, a multitude of sensors and components is provided, which are evaluated by a control device 1, or activated by control device 1. An environmental pressure sensor 2, a mass flow sensor 3, a throttle valve 4 and an intake manifold pressure sensor 5 are shown here, in exemplary fashion. All these components are connected to control unit 1 via corresponding lines 6.

The air pressure outside the motor vehicle is measured by environmental pressure sensor 2. The air quantity flowing through air duct 11 is measured by flow sensor 2. The flow cross section of air duct 11 is influenced by throttle valve 4, so that the quantity of air that flows into combustion chamber 10 can be controlled. The pressure in air duct 11 is measured immediately before combustion chamber 10 by intake manifold pressure sensor 5.

All these components, that is, sensors 2, 3, 5 or actuator 4, are used for controlling the motor vehicle or, in this case, the internal combustion engine. Within control device 1, characteristic values are used for internal calculations, that is, values which represent either a sensor value or a control variable for an actuator or an intermediate step of the calculation. Based on manufacturing variances of the components, or changes during the running operation, it is necessary, in this instance, for the purpose of evaluating the sensor signals or for the purpose of activating actuators, to adjust the characteristic values to the components. For instance, the setting of throttle valve 4 can vary to a certain degree, as a function of the activating signals that are generated by control device 1. Based on measurements of sensors, control device 1 can ascertain what deviations throttle valve 4 has from ideal behavior, and can compensate for this effect by an appropriate adjustment or adaptation of the characteristic values that are used for activating throttle valve 4. The adjustment starts from an initial value for the characteristic value, which corresponds to an ideal state of the sensors or actuators. Starting from this initial value, an adaptation is then made, that is, an adjustment to the real behavior of the individual components. In the same way, the measuring signal of sensor 5, for example, may have certain deviations from an initial value, which is then also taken into consideration by an adaptive characteristic value in the control device.

If characteristic values adapted in such a way are used, the adaptation of control device 1 has to be limited, in the process, in order not to adapt the characteristic values to nonsensical and implausible values. Therefore, threshold values are provided for each adapted characteristic value. For characteristic values which are able to be adapted in the positive as well as the negative direction, an upper and lower threshold value is then provided correspondingly. For characteristic values that can only be adapted in one direction, such as adapted only positively, only one threshold value is then provided. When the adapted characteristic value goes beyond the threshold value, this characteristic value is judged to be faulty, and there follows a corresponding error message. As a function of such an error message, further measures, such as an emergency operation or an additional fault search can then be undertaken.

For a part of the characteristic values, the situation will probably be that a fixed upper and lower limit is provided for the threshold value. For instance, in the case of the throttle valve, there may be an angular error in the setting of throttle valve 4, which originates from manufacturing fluctuations. This is possible, for instance, to the extent of ±2 degrees. In this context, this fluctuation is independent of operating states of the motor vehicle, that is, the corresponding adapted characteristic value, which compensates for the fluctuation of the throttle valve setting, has a threshold value that is independent of the operating states of the motor vehicle. By contrast, in the case of pressure sensor 5, which measures the intake manifold pressure immediately before combustion chamber 10, the measuring error present at pressure sensor 5 is a function of the operating state of the motor vehicle or the internal combustion engine. At low engine speed the measuring error of pressure sensor 5 is low, whereas at a high engine speed and a simultaneously largely closed throttle valve 4, a very large measuring error can occur. The corresponding adapted characteristic value, which takes these fluctuations into account must, therefore, be compared to threshold values which also depend on the operating states of the motor vehicle or the internal combustion engine.

From the adapted characteristic values, normalized characteristic values are therefore formed, which make the individual characteristic values comparable to one another. In this context, normalization is always carried out in principle to a value of 100%, a normalization of 100% meaning that the adapted characteristic value has attained the threshold value. In the case of the example of throttle valve 4 named above, this means that a normalized characteristic value of ±100% corresponds to the admissible maximum deviation of ±2 degrees angular tolerance of throttle valve 4. For the above example of the pressure sensor, for the purpose of normalization, the dependence of the threshold values of the operating states of the motor vehicle or the internal combustion engine has to be taken into account. For a low engine speed and a wide open throttle valve 4, the normalized value ±100% thus means a clearly narrower band than for an operating state having an almost closed throttle valve and a high speed, in which, in fact, high values for the intake manifold pressure can occur, and correspondingly great fluctuations in the signal measured by pressure sensor 5.

In general, it is specified by the normalization to what extent the adapted characteristic value has already changed, starting from its initial value, by the adaptation in the direction towards the threshold value. This value can then be stated, for example, as a percentage or as a value between 0 and ±1.

Figure 2:
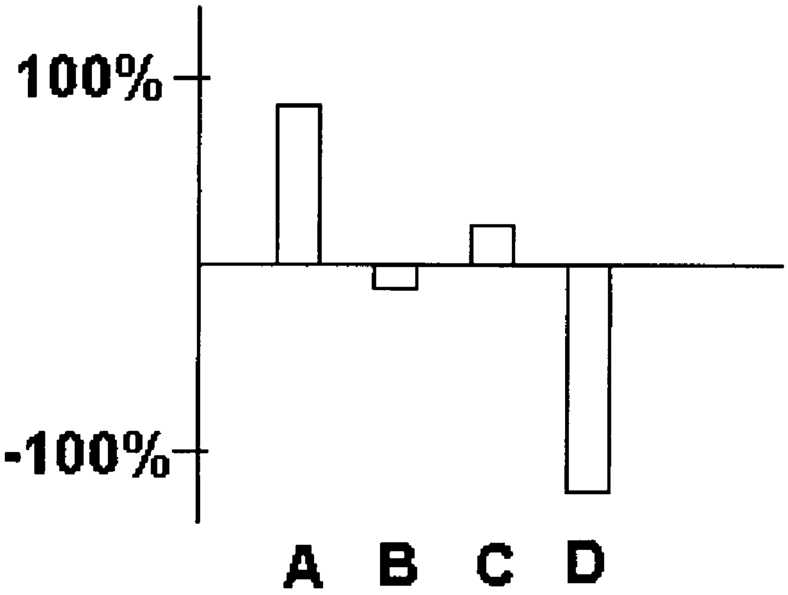
FIG. 2 shows a graphic representation of several normalized characteristic values.

In FIG. 2, schematically several normalized characteristic values A, B, C, D are shown on a scale of −100% to +100%. Normalized characteristic values A, B, C, D are calculated from adapted characteristic values, which are drawn upon for controlling the motor vehicle. Normalized characteristic value A represents a characteristic value for the plausibility of the air supply to combustion chamber 10, in this instance, that is, a characteristic value which, in view of the measured environmental pressure of sensor 2, the setting of throttle valve 4 and the value measured by intake manifold sensor 5 forms a plausibility value, which states whether these values are all plausible with respect to one another. As may be seen in FIG. 2, characteristic value A reaches a value of 90%, that is, it is directly before achieving the threshold value. Values B and C represent normalized characteristic values of the adaptation of mass flow sensor 3 and throttle valve 4. Characteristic value B for mass flow sensor 3 has a value of −10% and is thus located in direct proximity to the initial value, whose value amounts to 0 as normalized value. Likewise, the adapted characteristic value for the throttle valve setting is close to the initial value, so that normalized characteristic value C, at +20%, is close to initial value 0. However, normalized characteristic value D, which has a value of −80%, is conspicuous. This normalized characteristic value D is derived from the adapted characteristic value for the pressure value measured by intake manifold pressure sensor 5. The adapted characteristic value for intake manifold pressure 5 is compared before a start of the internal combustion engine to the environmental pressure that is measured by environmental pressure sensor 2, and from this a correction value for the zero point of intake manifold pressure sensor 5 is calculated.

None of the normalized characteristic values shown here has a value beyond the threshold values of +100%. As seen by itself, it would also be no problem if the plausibility value, that is, normalized characteristic value A, or the intake manifold pressure sensor correction value, that is, normalized characteristic value D, had a value of −80%. The pattern shown here, characteristic value A +90%, characteristic value D −80%, may, however, be typical for a faulty pressure sensor 5. Consequently, for the purpose of diagnosis, not only is the exceeding of a threshold value evaluated, but also when several characteristic values change in a certain way. Such typical patterns of the adapted characteristic values or the normalized characteristic values derived from them can be gathered either based on theoretical considerations or by experience on real motor vehicles. A malfunction or failure of a certain component, be it a sensor or an actuator, can thus be brought into connection, using certain deviation patterns of the normalized characteristic values. The possibilities of the diagnosis, and particularly of the identification of an individual faulty component, are improved thereby.

The method according to the present invention can, for instance, also be used to identify faulty components if one of the adapted characteristic values goes beyond a threshold value. Normalized characteristic value A could, for instance, have a value of +100%, which would indicate that consistent air supply through air duct 11 was implausible. However, based on this information alone, it could not be identified which of various components in connection with air duct 11, such as mass flow sensor 3, throttle valve actuator 4 or intake manifold pressure sensor 5 is the one that is faulty. The identification of faulty component 3, 4, 5 could then be made by evaluation of additional values, for instance, as described above, normalized characteristic values B, C, D.

If, as described in connection with FIG. 2, an error function of intake manifold pressure sensor 5 is determined, based on normalized characteristic values, additional tests can be run to verify this error function of intake manifold pressure sensor 5. For instance, at an operating point at which throttle valve 4 is wide open, the pressure of intake manifold pressure sensor 5 could be compared to the environmental pressure or, as a function of speed, to the mass flow at mass flow sensor 3. For, in response to a fully opened throttle valve 4, there is a direct connection between the environmental pressure and the mass flow through air duct 11. It can be checked in this way whether the fault in the intake manifold pressure sensor 5, determined based on the deviation of the several normalized characteristic values, actually exists or not.

The method according to the present invention can also be initiated by a repair shop, either in connection with a repair, to identify the actual faulty component or, in routine fashion, within the scope of an inspection. In this context, in a diagnostic tester of the repair shop, data can be stored regarding characteristic patterns of normalized characteristic values, which identify a faulty component. In the case of components that have become subject to ageing, these patterns can also be used to identify the ageing state of a component and hopefully to make possible an exchange of a part before it fails.

What is claimed is:

1. A method for a diagnosis of a motor vehicle comprising:

adapting a plurality of characteristic values which are used for a control of the motor vehicle;

comparing the adapted characteristic values in each case to at least one associated threshold value;

providing an error message if at least one adapted characteristic value goes beyond the associated threshold value;

forming normalized characteristic values by a normalization of the adapted characteristic values; and utilizing the plurality of normalized characteristic values jointly for detecting a possibly faulty component of the motor vehicle.

2. The method according to claim 1, wherein the adapted characteristic value, an initial value for the characteristic value and the associated threshold value are taken into account for the normalization of the adapted characteristic value.

3. The method according to claim 2, wherein the at least one threshold value is a fixed value which is read out from a memory.

4. The method according to claim 2, wherein the at least one threshold value is a function of operating states of the motor vehicle, and the normalization of the adapted characteristic value takes place as a function of the operating states of the motor vehicle.

5. The method according to claim 1, further comprising, in response to a detection of a possibly faulty component, running an additional test program by the control in order to recognize a cause of a possible fault.

6. The method according to claim 1, wherein the method for the diagnosis is initiated in a repair shop.

7. The method according to claim 1, wherein the method for the diagnosis is triggered by an error message.

8. A control device for controlling a motor vehicle, comprising:

an arrangement for adapting a plurality of characteristic values;

an arrangement for comparing the adapted characteristic values in each case to at least one associated threshold value;

an arrangement for generating in each case an error message if at least one adapted characteristic value goes beyond the associated threshold value;

an arrangement for performing a normalization of the adapted characteristic values; and an arrangement for using the plurality of normalized characteristic values jointly for a detection of a possibly faulty component of the motor vehicle.

* * * * *